(12) United States Patent
Sweet

(10) Patent No.: US 10,706,810 B2
(45) Date of Patent: Jul. 7, 2020

(54) SOFTWARE-ROTATABLE DISPLAY LAYOUT FOR LABELLING BUTTONS

(71) Applicant: Rosemount Inc., Shakopee, MN (US)

(72) Inventor: Jared Evans Sweet, Eden Prairie, MN (US)

(73) Assignee: ROSEMOUNT INC., Shakopee, MN (US)

( * ) Notice: Subject to any disclaimer, the term of this patent is extended or adjusted under 35 U.S.C. 154(b) by 30 days.

(21) Appl. No.: 16/142,358

(22) Filed: Sep. 26, 2018

(65) Prior Publication Data

US 2020/0098331 A1 Mar. 26, 2020

(51) Int. Cl.
*G09G 5/00* (2006.01)
*G09G 5/38* (2006.01)
*G06F 3/02* (2006.01)
*G05B 15/02* (2006.01)

(52) U.S. Cl.
CPC .............. *G09G 5/003* (2013.01); *G05B 15/02* (2013.01); *G06F 3/02* (2013.01); *G09G 5/38* (2013.01); *G09G 2340/0492* (2013.01); *G09G 2380/04* (2013.01)

(58) Field of Classification Search
None
See application file for complete search history.

(56) References Cited

U.S. PATENT DOCUMENTS

| 7,134,354 | B2 | 11/2006 | Nelson et al. | |
|---|---|---|---|---|
| 2005/0090288 | A1* | 4/2005 | Stohr | H04M 1/23 455/566 |
| 2012/0236033 | A1 | 9/2012 | Rud et al. | |
| 2015/0205400 | A1* | 7/2015 | Hwang | G06F 3/0488 345/654 |

(Continued)

FOREIGN PATENT DOCUMENTS

WO    WO 2005/041546    5/2005

OTHER PUBLICATIONS

Office Action from Chinese Patent Application No. 201822142730.1, dated Jul. 9, 2019.

(Continued)

*Primary Examiner* — Michael J Cobb
(74) *Attorney, Agent, or Firm* — Westman, Champlin & Koehler, P.A.

(57) ABSTRACT

A display assembly with a software rotatable content layout for a process control transmitter. The assembly has a display screen configured for displaying the rotatable content layout in a plurality of configurations and at least one physical button fixedly positioned proximate one side of the display screen. In one embodiment, the display layout comprises an upper perimeter band and a lower perimeter band reserved for displaying at least one label and a right side band and a left side band reserved for displaying an indicator attached to the at least one label and a third, interior region reserved for displaying additional text such that the at least one label is visually attached to the physical button proximate the one (Continued)

side of the display screen. The display is rotatable to maintain content in a viewer orientation such that at least one label is visually tied to at least one physical button in each of the plurality of configurations.

19 Claims, 4 Drawing Sheets

(56) References Cited

U.S. PATENT DOCUMENTS

2015/0302555 A1   10/2015  Paulussen et al.
2015/0331589 A1*  11/2015  Kawakita ................ G06F 1/163
                                                            715/834

OTHER PUBLICATIONS

Notification of Transmittal of the International Search Report and the Written Opinion of the International Searching Authority, from International Application No. PCT/US2019/038979, dated Sep. 20, 2019.

* cited by examiner

SOFTWARE-ROTATABLE DISPLAY LAYOUT FOR LABELLING BUTTONS

BACKGROUND

The present invention relates to a visual display assembly for use with an electronic device. More specifically, the present invention relates to on-screen labels visible on a display in connection with unlabeled display buttons on a process control transmitter.

Display systems play a prominent role in the design of many electronic devices for presenting content to a user. Typically, content is intended for viewing from a particular viewer orientation. Display systems may be configured to orient the display of content based on rotation of the electronic device so that the orientation of the content in the particular viewer orientation is maintained.

In industrial processes, it is often necessary for an operator to obtain information regarding the operation of the process. Remote units, known as "transmitters," are coupled to the process and transmit information related to process variables (pressure, temperature, flow rate, etc.) to a transmitter display for visual inspection. Transmitter displays also typically include physical buttons near the display for interacting with the remote unit locally.

The transmitters can be mounted in various orientations, meaning the display screen and buttons must be mounted to the transmitter based on the orientation of the mounted transmitter to provide the display in a user orientation. The entire display assembly can be physically rotated independently of the transmitter electronics to guarantee that the physical buttons will be found on a same side of the display as the display content, thus making the on-screen orientation of corresponding labels straight forward. Alternatively, transmitters of the prior art include fixed physical buttons, each having a single function so that a physical label can be applied directly to the button itself.

SUMMARY

An aspect of the present disclosure relates to a display assembly for process control transmitter. The display assembly is a display screen having a software rotatable visual layout and the layout has a plurality of configurations. The display assembly has at least one physical button in a fixed position proximate one side of the display screen. The display screen has a first region reserved for displaying at least one label and a second region reserved for displaying an indicator attached to the at least one label and a third region reserved for displaying additional text. These regions together form the visual layout. The layout is rotatable to maintain the visual content on the display screen in a selected viewer orientation, regardless of the positional orientation of the transmitter and display screen. The viewer orientation is an upright and left-to-right orientation for standard reading of text based on a position of the display screen with respect to a vertical axis. In each configuration, each label is visually tied to at least one physical button to identify a function of the button.

Each configuration of the plurality of layouts displays at least one label in the first region and an indicator visible in the second region to visually attach the label to one physical button. The label includes identifying text or image(s) to indicate a function of the button. The third region may then display additional text or images directed to the operation of the process and or transmitter function.

The display assembly is connectable to an electronics board of the process control transmitter. The rotation of the display layout and/or content is controlled by software.

Another aspect of the present disclosure relates to a process control transmitter having a display assembly for providing labels to one or more physical buttons on the transmitter. The transmitter includes a display assembly fixedly mounted on the transmitter and operably connected to control software for the transmitter. The display assembly has a display screen configured to provide a visual layout rotatable to a plurality of orientations, and the layout configured to display one or more labels and informational content. The display assembly is positioned next to one or more physical buttons supported on the transmitter. Each of the buttons is visually attached to one label visible on the display screen such that the labels and the buttons cooperate to allow a user to interact with the transmitter. The visual layout is changeable based on a positional orientation of the transmitter such that the one or more labels displayed on the display screen are each visually attached to one of the one or more physical buttons and the layout adapted to a selected viewer orientation regardless of the positional orientation of the transmitter.

The display screen is fixed with respect to the position of the physical buttons and the visual layout is rotatable via software to maintain the visual attachment of the at least one label to the at least one physical button.

Yet another aspect of the present disclosure relates to a process control transmitter having a display assembly with a software rotatable content layout. The transmitter includes a display screen configured for displaying the rotatable content layout in a plurality of configurations and at least one physical button fixedly positioned proximate one side of the display screen. The display layout has an upper perimeter band and a lower perimeter band reserved for displaying at least one label and a right side band and a left side band reserved for displaying an indicator attached to the at least one label as well as a third, interior region reserved for displaying additional text. The content layout is rotatable to maintain the content in a selected viewer orientation such that at least one label is visually tied to at least one physical button in each of the plurality of configurations and informational text is readable in the third region.

DETAILED DESCRIPTION

A display assembly is configured for use with an electronic device. The display assembly comprises a display screen for providing visual content tied to one or more physical buttons, which allows a user to interact with the electronic device and the display assembly. The display screen is mounted on the assembly in a fixed orientation with respect to the physical buttons. The visual content displayed on the display screen comprises informational text and labels for identification of the function of the physical buttons. The display assembly can be mounted to any side of the electronic device, which changes the orientation of the display screen with respect to a viewer orientation, however, the labels on the display screen are configured to rotate to a selected view orientation in a manner such that the labels remain visually linked to the physical buttons. The viewer orientation may be an orientation of the visual content with respect to a viewer, for example, the viewer orientation may be one in which the text is upright and oriented left-to-right. However, the display assembly will work equally well whether the viewer orientation is one where the content is oriented left-to-right or right-to-left. Examples of content include but are not limited to alphanumeric text or a symbol-based language in a top-to-bottom orientation.

While embodiments of the display assembly are described herein in connection with a remote unit for process control system monitoring, also referred to as a "transmitter", it should be understood that the display assembly described herein may be used with any electronic device having an electronics board and a software program for rotating a display screen or visual content thereon.

Figure 1:
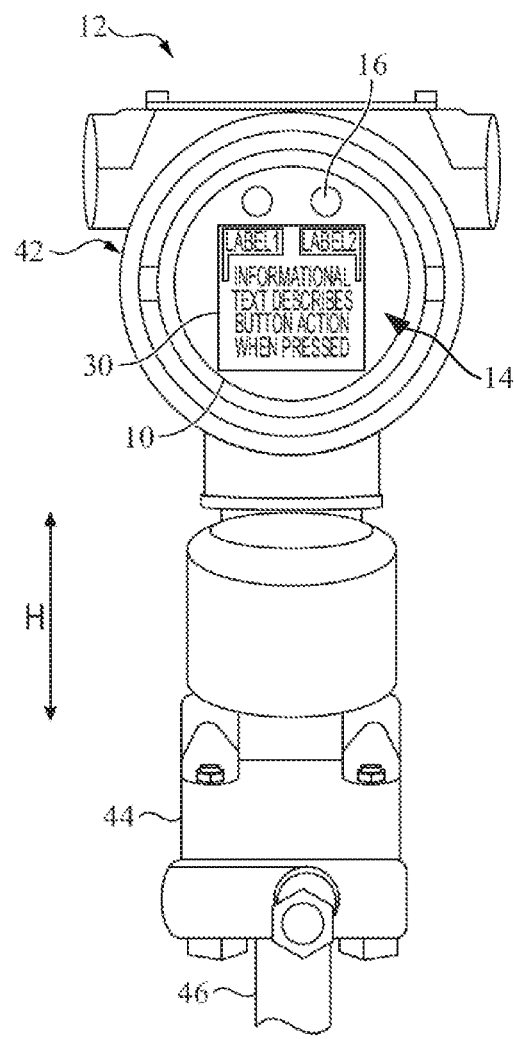
FIG. 1 illustrates a display assembly operably connected to a remote unit.
Figure 2:
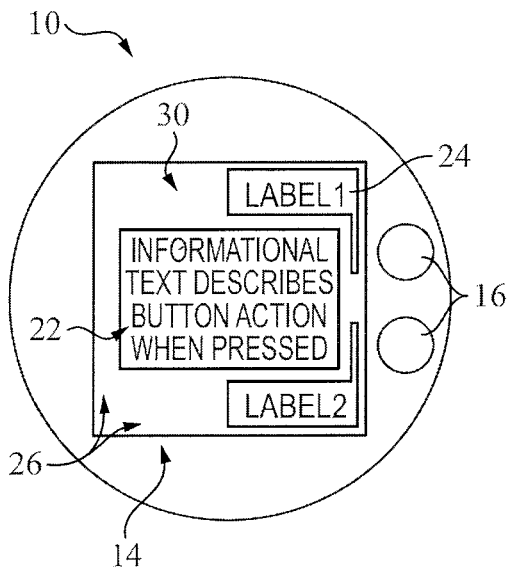
FIG. 2 illustrates a first orientation of visual content on a display screen of the display assembly.
Figure 3:
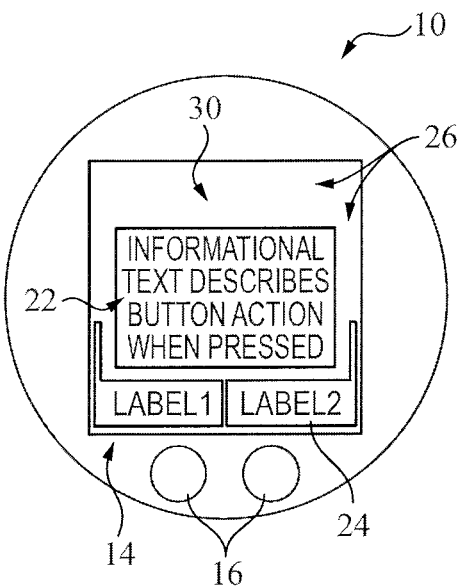
FIG. 3 illustrates a second orientation of the visual content on the display screen of the display assembly for a first rotated orientation.
Figure 4:
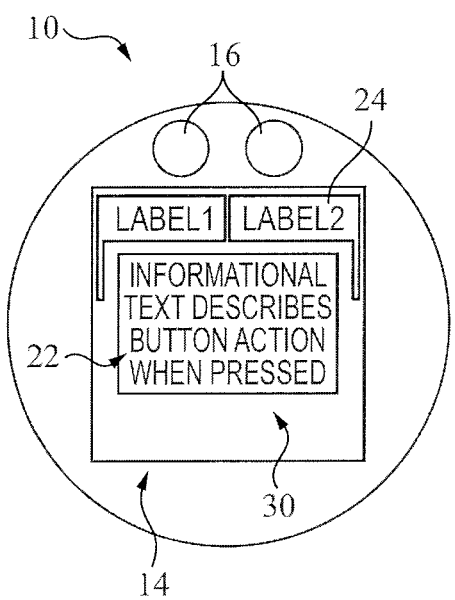
FIG. 4 illustrates a third orientation of the visual content on the display screen of the display assembly for a second rotated orientation.
Figure 5:
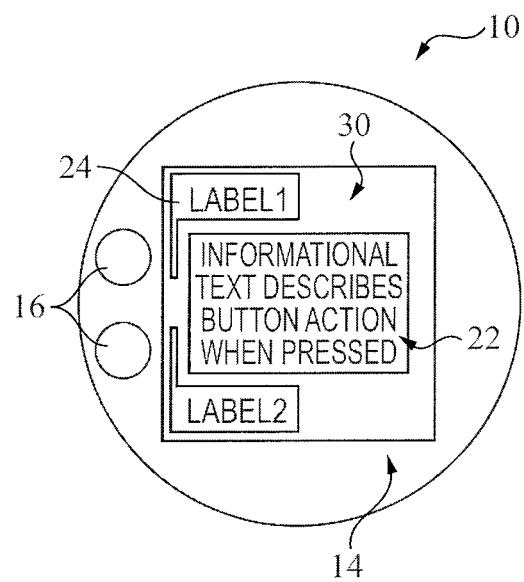
FIG. 5 illustrates a fourth orientation of the visual content on the display screen of the display assembly for a third rotated orientation.

As illustrated in FIG. 1, a display assembly 10 is configured for use with an electronic device 12. The electronic device may be a remote unit such as a transmitter 12 for use in a process control system for monitoring an industrial process. In the embodiment illustrated herein, the process control transmitter 12 has a display assembly 10 integrally mounted thereon and connected to the electronics board of the transmitter 12. The display assembly 10 comprises a display screen 14 and the assembly supports one or more physical buttons 16 for interacting with the transmitter 12. The display assembly 10 is connectable to the electronics board of the transmitter 12 in a first orientation. The first orientation may be a fixed orientation.

The display assembly 10 may comprise a square or a rectangular display screen 14, which can be arranged squarely with the height and width directions of the transmitter 12 or oriented such that sides of the square or rectangular display 14 are at an angle to the height direction of the transmitter 12. The display assembly may then be mounted on any side or face of the transmitter 12. Generally, the characters or text on the display screen 14 are then also aligned with the sides of the display 14. Frequently, LCDs (liquid crystal display) are used in which information is conveyed by activating elongate liquid crystal segments. In one embodiment, the present invention is implemented using liquid crystal or light emitting diode elements. However, any display technology can be used.

The display screen 14 is configured to visually display various content which includes informational text 22 and one or more labels 24. The labels 24 are labels which correspond to the buttons 16 and generally identify the function or purpose of the corresponding button 16. The buttons 16 of the display assembly 10 do not have physical or permanent labels as the function or purpose of each button 16 may be contextual based on an operational state of the transmitter 12.

As illustrated in FIGS. 2-6, the display screen 14 displays a visual layout 30. The display screen 14 comprises a first portion 26 reserved for displaying the labels 24. The first portion 26 may be a perimeter border of the display screen 14, this perimeter is defined by edges of the display screen 14. A center portion 28 or remainder of the display screen 14 is then configured to display content such as informational text 22. The visual layout 30 identifies or labels the buttons 16 while concurrently providing a portion 28 for the display of informational text 22 regardless of the positional orientation of the display screen 14 or the position of the display assembly 10. That is, the layout 30 is changeable with rotation the screen 14 and/or assembly 10. Further, the center portion 28 retains its size and orientation of the informational text when the display 14 is rotated or regardless of a side of the transmitter 12 on which the display assembly 10 is mounted. Thus, the visual layout 30 remains consistent with respect to a selected viewer orientation regardless of the direction of the display screen 14 and its relationship to the physical buttons 16.

Figure 6:
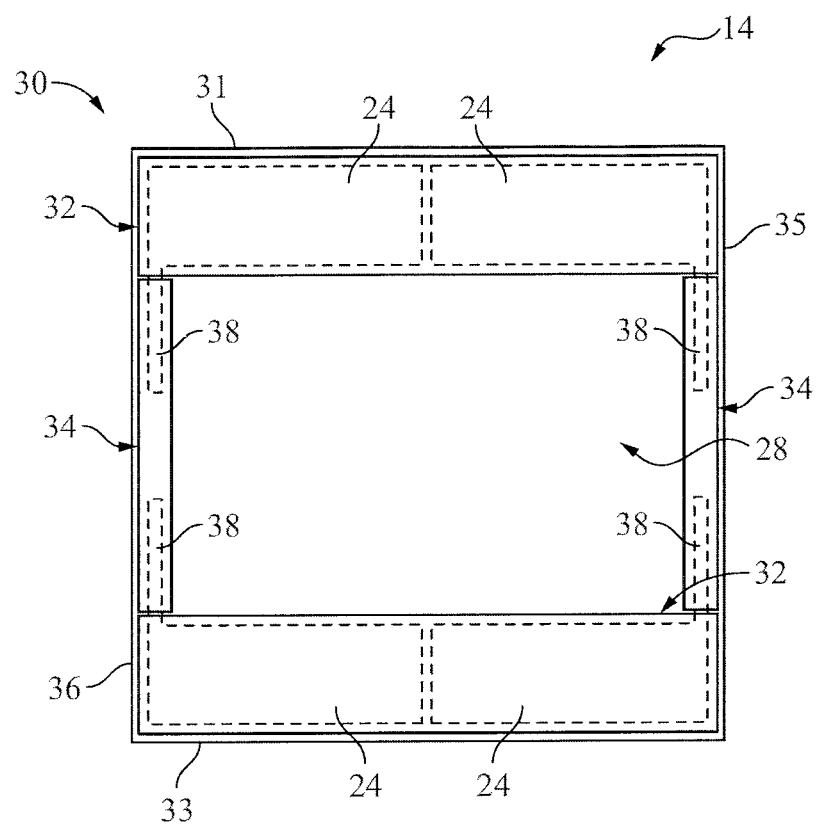
FIG. 6 illustrates the display screen for rotating a layout of the visual content.

As illustrated in further detail in FIG. 6, to achieve the various configurations of the visual layouts 30 as illustrated in FIGS. 2-5, the first portion 26 of the display screen 14 is reserved for displaying the labels 24. The first portion 26 comprises two sections 32 and 34, where a first section 32 is a band of the display screen 14 on opposing edges of the display screen, for example the first section comprises a band on a top edge 31 and on a bottom edge 33 of the display screen 14. A second section 34 is a second band 34 positioned on the opposing edges 35 and 36 adjacent the band 32, for example on side edges 35 and 36. The second section 34 is preferably a narrow band 34 meaning that the width of the second band 34 is less than the width of the first band 32. The second band 34 is reserved for displaying indicators 38 extending from each label that visually attach the label 24 to the corresponding button 16. The first band 32 displays the label 24 including the label information which may be text and or an image.

As shown in the embodiments illustrated in the figures, the labels 24 are placed in opposing corners of the display screen 14 closest to the side of the display screen 14 on which the buttons 16 are located. Further, a box may be drawn around the indicators 38 that flow to the edge of the screen 14 shared with the buttons 16. Thus, the position of the labels 24 and the indicators 38 is movable around the perimeter of the display screen, depending on the viewer orientation of the display screen 14. The labels 24 and indicators 38 along with the center portion 28 for information text provides the rotatable visual layout 38 that maintains the information in an upright and horizontal viewer orientation while maintaining the visual attachment of the labels 24 to the physical buttons 16.

While the embodiments illustrated herein refer to a generally square display screen, the layouts can be adapted and used with display screens of any shape or any display screen in which rotation of the content on the display screen is controlled by corresponding software.

Consistency in the viewer orientation of the visual layout 30 reduces user confusion and/or error when using the transmitter 12. The rotatable visual layout 30 also minimizes display screen dead space, which improves user experience and ease of interaction with the display assembly 10 and/or transmitter 12. The visual layouts 30 allow the labels 24 to retain a size sufficient to display meaningful text or indicators of corresponding button 16 function, regardless of orientation of the layout 30. Further, the rotation of the display screen 14 and corresponding layout 30 change as illustrated in FIGS. 2-7 avoids vertical text shift, such that the text on the labels 24 remains vertical and horizontal (e.g., upright and read "left-to-right").

Figure 7:
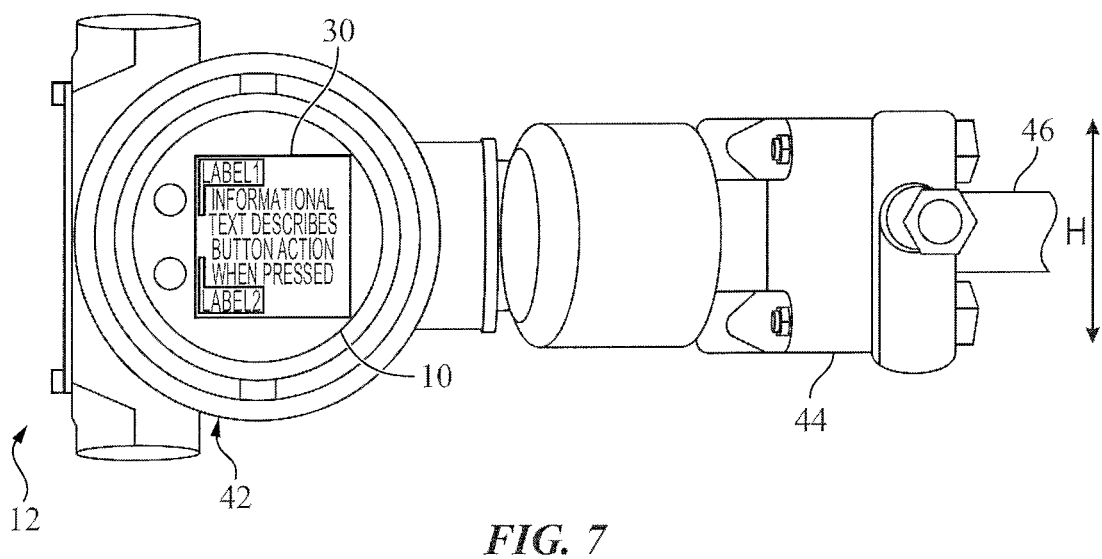
FIG. 7 illustrates the display assembly on the remote unit in a rotated orientation wherein the layout is correspondingly rotated.

The transmitters 12 can be mounted in a plurality of different orientations when in use. Further, the display assembly 10 can be mounted on any face of the transmitter 12. The plurality of orientations require the display screen 14 orientation to be changeable by the user to maintain the content 22 in a viewer orientation. As illustrated in FIG. 7, when the transmitter 12 is rotated for installation, the display screen 14 rotates the visual layout 30 including the labels 24. This allows the labels 24 to continually correspond to the buttons 16 in a user readable orientation, regardless of the orientation of the display assembly 10 or device 12.

In the display assembly 10 described herein, the orientation of the display assembly 10 and thus the display screen 14, relative for example, to a ground surface, may have a viewer orientation that is offset from or rotated with respect to a vertical axis normal to the ground surface. The vertical axis is illustrated with respect to the transmitter 12 and display assembly 10 by arrow "H" in FIGS. 1 and 7. In one embodiment, the buttons 16 are positioned immediately next to the display screen 14. For example, the display assembly 10 may include buttons 16 below an LCD screen with respect to a viewer orientation and the display assembly 10 mounted to a device 12 such that the display screen 14 is mounted in an "upside-down" viewer orientation where the buttons 16 are then on top of the LCD screen. The layout 30 according to the embodiments herein would maintain the label text in an upright, horizontal orientation with respect to the viewer's orientation while maintaining a visual attachment of the labels 24 to the physical buttons 16.

Figure 8:
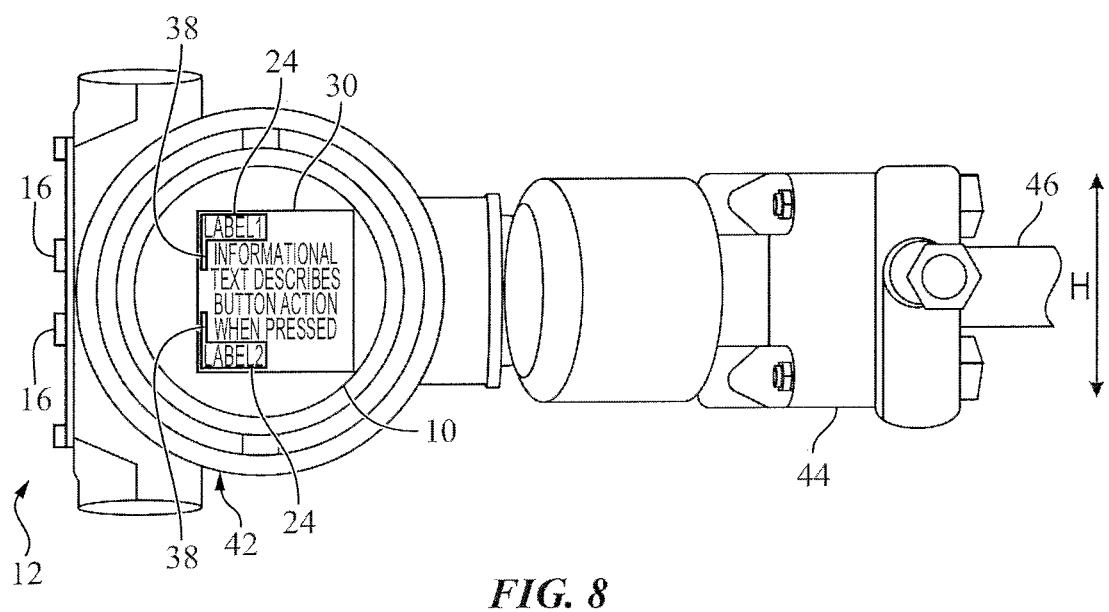
FIG. 8 illustrates a configuration of the display assembly and associated buttons.

The buttons 16 can be integrated into the device 12 and in a recessed position on a first side or face 50 of the device 12. The display screen 14 is then positioned on a second side or face 52 of the device 12. The sides 50, 52 are generally adjacent sides of the device 12 such that the labels 24 of the display screen 14 are visibly attached to the buttons 16 in substantially the same manner as described herein. As illustrated in FIG. 8, the display assembly 10 includes the buttons 16 located on a top side 50 of the device 12 and the display screen 14 positioned on a front face 52 of the device 12. The display assembly 10 may include the buttons 16 operably secured to the device 12 on a different side or face of the device 12 than the display screen 14. The buttons 16 and the display screen 14 are positioned in a manner such that the labels 24 and corresponding indicators 38 on the display screen 14 provide and maintain the visual attachment of the labels 24 to the physical buttons 16. The layout 30 is rotatable via software to allow the labels 24 to continually correspond to the buttons 16 in a user readable orientation, regardless of the orientation of the display assembly 10 or device 12 or the location of the buttons 16 relative to the display screen 14.

Although the display of the present invention is shown with a particular transmitter configuration, the display can be used with other process control instrumentation (including any process device which is located in the field such as control elements) in which it is desirable to display information. The invention efficiently utilizes the space available on the face of the display assembly. External space for displaying information on a process device is limited. The display assembly described herein allows additional data to be displayed, or to be displayed in a more readable format, then in typical prior art designs.

Referring back to FIG. 1, the transmitter 12 may include a housing 42 and a process coupling 44 which couples to process piping 46. In the arrangement illustrated in FIG. 1, a display assembly 10 is oriented such that the physical buttons 16 are positioned above the display screen 14 in a first position according to the height direction of the transmitter. In the arrangement illustrated in FIG. 7, the transmitter is rotated and thus the display assembly 10 is rotated such that the physical buttons 16 are positioned to one side (e.g., the left side) of the display screen 14 in a second position according to the height direction of the transmitter. The layout is rotated to maintain visual connection of the labels 24 to the buttons 16 with the indicators 38.

In further detail, in one embodiment, the display assembly 10 is operably connected to the electronics board of the transmitter 12 and the operation of the display assembly 10 is controlled by operational software of the transmitter 12. The operational software includes a graphic module that includes various known software components for rendering and displaying graphics including but not limited to the informational text and labels on the display screen 14. The graphic module comprises the components for changing the text and images displayed on the screen in connection with the function of the physical buttons, and changing the orientation of the images and/or text based on the orientation of the display assembly 10 on the transmitter 12.

The display screen 14 is a hardware component that shows the output produced by the software of the transmitter 12 as rendered through the graphics module and the display screen 14 is configurable to provide a consistent visual layout 30 for different rotation settings. In general, the layout comprises labels in corner sections of the display screen, including the labels being positioned in opposing upper corners, opposing lower corners, or adjacent upper and lower corners of the display screen. Each label has a corresponding indicator extending at an angle away from connection with the label and wherein the indicator visually attaches the label to the respective physical button.

Although the present disclosure has been described with reference to preferred embodiments, workers skilled in the art will recognize that changes may be made in form and detail without departing from the spirit and scope of the disclosure.

The invention claimed is:

1. A display assembly for a process control transmitter, the display assembly comprising:
   a display screen having a software rotatable display layout, the layout comprising a plurality of configurations; and
   at least one physical button positioned outside the display screen and alongside a first edge of the display screen, the at least one physical button having a fixed position relative to the display screen,
   wherein:
      the display layout comprises a first region reserved for displaying at least one label, a second region reserved for displaying an indicator attached to the at least one label and a third region reserved for displaying additional text;
      the display layout is rotatable to maintain content in a selected viewer orientation such that the at least one label is visually tied to the at least one physical button in each of the plurality of configurations of the display layout; and
      the plurality of configurations include:

a first configuration, in which the first edge has a first orientation relative to the selected viewer orientation;

a second configuration, in which the first edge has a second orientation relative to the selected viewer orientation that is perpendicular to the first orientation;

the first region extends along the first edge of the display screen when the display layout is in the first configuration;

the first region extends along a second edge of the display screen that is perpendicular to the first edge when the display layout is in the second configuration; and the indicator extends along the first edge of the display screen and visually ties the at least one physical button to the at least one label in the first region when the display layout is in the second configuration.

2. The display assembly of claim 1, wherein the first region comprises two perimeter bands positioned on a first pair of opposing edges of the display screen and wherein the second region comprises two perimeter bands positioned on a second pair of opposing edges of the display screen, wherein the edges of the second pair of opposing edges are adjacent the edges of the first pair of opposing edges of the display screen, the first pair of opposing edges includes the first edge and the second pair of opposing edges includes the second edge when the display screen is in the first configuration, and the first pair of opposing edges includes the second edge and the second pair of opposing edges includes the first edge when the display screen is in the second configuration.

3. The display assembly of claim 2, wherein a width of perimeter bands of the second region is less than a width of the perimeter bands of the first region.

4. The display assembly of claim 2, wherein the perimeter bands of the first region are configured to display the at least one label and the perimeter bands of the second region are configured to display the indicators attached to the at least one label.

5. The display assembly of claim 1, wherein the first region comprises an upper perimeter band and a lower perimeter band and the second region comprises a right side band and a left side band and wherein the at least one label is visible in the upper or lower perimeter and the indicator of the label is visible in the right side band or the left side band such that the at least one label is visually attached to the physical button.

6. The display assembly of claim 1, wherein each display layout of the plurality of display layouts comprises the at least one label visible in the first region and an indicator visible in the second region and the label visually attached to at least one physical button to identify a function of the button.

7. The display assembly of claim 1, wherein at least one of the first region and the third region display content is aligned upright with respect to the viewer orientation such that the content is readable in an upright and left-to-right configuration in each of the plurality of layouts with respect to a positional orientation of the display screen.

8. The display assembly of claim 1, wherein the display assembly is connectable to an electronics board of the process control transmitter.

9. The display assembly of claim 1, wherein the at least one physical button is positioned proximate the display screen on a same face of the device.

10. The display assembly of claim 1, wherein the at least one physical button is positioned proximate the display screen on a different face of the device.

11. A process control transmitter, comprising:

a display assembly fixedly mounted on the transmitter and operably connected to control software for the transmitter, the display assembly comprising:

a display screen configured to provide a visual layout rotatable to a plurality of orientations, the visual layout configured to display one or more labels and informational content and including a first region reserved for displaying the one or more labels, a second region reserved for displaying at least one indicator, and a third region reserved for displaying additional text; and one or more physical buttons supported on the transmitter outside the display screen and positioned alongside a first edge of the display screen, the one or more physical buttons having a fixed position relative to the display screen, each of the one or more physical buttons visually attached to one of the one or more labels on the display screen using the at least one indicator such that the labels and the buttons are associated to allow a user to interact with the transmitter;

wherein the visual layout is changeable to one of a plurality of configurations based on a positional orientation of the transmitter relative to a selected viewer orientation such that the one or more labels displayed on the display screen are each visually attached to one of the one or more physical buttons regardless of the positional orientation of the transmitter, wherein the plurality of configurations include:

a first configuration, in which the first edge has a first orientation relative to the selected viewer orientation;

a second configuration, in which the first edge has a second orientation relative to the selected viewer orientation that is perpendicular to the first orientation;

the first region extends along the first edge of the display screen when the display layout is in the first configuration;

the first region extends along a second edge of the display screen that is perpendicular to the first edge when the display layout is in the second configuration; and the indicator extends along the first edge of the display screen and visually ties the at least one physical button to the at least one label in the first region when the display layout is in the second configuration.

12. The transmitter of claim 11, wherein the display screen comprises a perimeter display region and a center display region for displaying content.

13. The transmitter of claim 12, wherein the perimeter display region includes the first region and is configured to display the one or more labels therein.

14. The transmitter of claim 11, wherein the visual layout is rotatable via software to maintain the visual attachment of at least one label of the one or more labels to a respective physical button of the one or more physical buttons.

15. The transmitter of claim 11, wherein the display screen comprises an upper and a lower perimeter reserved for display of at least one label of the one or more labels and further comprises opposing side perimeter edges reserved for display of an indicator portion of the at least one label of the one or more labels for identifying the function of the button visually attached to at least one label.

16. The transmitter of claim 11, wherein at least one label is positioned in an upper or lower perimeter of the display screen in each of the plurality of configurations of the layouts.

17. A process control transmitter having a display assembly with a software rotatable content layout, the transmitter comprising:
    a display screen configured for displaying the rotatable content layout in a plurality of configurations; and
    at least one physical button fixedly positioned outside the display screen and alongside a first edge of the display screen, wherein the display layout comprises an upper perimeter band and a lower perimeter band reserved for displaying at least one label and a right side band and a left side band reserved for displaying an indicator attached to the at least one label and a third, interior region reserved for displaying additional text,
    wherein the display is rotatable to maintain content in a viewer orientation such that at least one label is visually tied to at least one physical button in each of the plurality of configurations, the plurality of configurations including:
        a first configuration, in which the first edge has a first orientation relative to the viewer orientation;
        a second configuration, in which the first edge has a second orientation relative to the viewer orientation that is perpendicular to the first orientation;
        one of the upper perimeter band and the lower perimeter band extends along the first edge of the display screen when the layout is in the first configuration;
        one of the upper perimeter band and the lower perimeter band extends along a second edge of the display screen that is perpendicular to the first edge when the layout is in the second configuration; and
        the indicator extends along the first edge of the display screen and visually ties the at least one physical button to the at least one label in the first region when the layout is in the second configuration.

18. The transmitter of claim 17, wherein the at least one physical buttons is positioned proximate the display screen on a same face of the transmitter and wherein each orientation of the plurality of configurations of the layout comprises the at least one label visible in the upper or lower band and the indicator of the label visible in the right or left side band such that one of the at least one label is visually attached to one of the at least one physical button via the indicator regardless of a side of the display the buttons are fixedly positioned proximate to in order to identify a function of the one of the at least one button.

19. The transmitter of claim 17, wherein the at least one physical buttons is positioned proximate the display screen on a different face of the transmitter and wherein each orientation of the plurality of configurations of the layout comprises the at least one label visible in the upper or lower band and the indicator of the label visible in the right or left side band such that one of the at least one label is visually attached to one of the at least one physical button via the indicator regardless of the orientation of the transmitter in order to identify a function of the one of the at least one button.

\* \* \* \* \*